United States Patent
De Brabanter (10) Patent No.: US 8,905,266 B2
(45) Date of Patent: Dec. 9, 2014

(54) METHOD FOR MULTIPLE DOSAGE OF LIQUID PRODUCTS, DOSING APPARATUS AND DOSING SYSTEM

(75) Inventor: Dirk De Brabanter, Bellingen (BE)

(73) Assignee: Ecolab Inc., St. Paul, MN (US)

( * ) Notice: Subject to any disclaimer, the term of this patent is extended or adjusted under 35 U.S.C. 154(b) by 331 days.

(21) Appl. No.: 11/570,411

(22) PCT Filed: Jun. 23, 2004

(86) PCT No.: PCT/EP2004/006773
§ 371 (c)(1),
(2), (4) Date: Feb. 20, 2007

(87) PCT Pub. No.: WO2006/000237
PCT Pub. Date: Jan. 5, 2006

(65) Prior Publication Data
US 2008/0058771 A1    Mar. 6, 2008

(51) Int. Cl.
*G01G 17/06* (2006.01)
*B01F 13/10* (2006.01)
*G01F 11/00* (2006.01)
*G05D 7/06* (2006.01)
*B01F 15/04* (2006.01)

(52) U.S. Cl.
CPC .............. *G05D 7/0682* (2013.01); *G01G 17/06* (2013.01); *B01F 13/1055* (2013.01); *G01F 11/00* (2013.01); *B01F 15/0445* (2013.01)
USPC ........................................... 222/77; 366/141

(58) Field of Classification Search
USPC ........................................... 222/77; 366/141
See application file for complete search history.

(56) References Cited

U.S. PATENT DOCUMENTS

| | | | |
|---|---|---|---|
| 33,861 A | 12/1861 | Whitney | |
| 1,985,615 A | 12/1934 | Mitchell | |
| 2,219,597 A | 10/1940 | Lutz | |
| 2,254,269 A * | 9/1941 | Clark et al. | 134/57 D |
| 2,319,739 A | 5/1943 | Kessler | |
| 2,333,791 A | 11/1943 | Hutchinson, Jr. | |
| 2,594,975 A * | 4/1952 | Mylting | 366/141 |

(Continued)

FOREIGN PATENT DOCUMENTS

| | | | | |
|---|---|---|---|---|
| DE | 3933763 A1 * | 4/1991 | | G01F 13/00 |
| DE | 4419415 A1 * | 12/1995 | | B01F 15/04 |

(Continued)

OTHER PUBLICATIONS

English Abstract of EP 0 917 906 A1, Published May 26, 1999, 1 page.

(Continued)

*Primary Examiner* — David Sorkin
*Assistant Examiner* — Abbas Rashid
(74) *Attorney, Agent, or Firm* — Shumaker & Sieffert, P.A.

(57) ABSTRACT

The present invention provides methods for the multiple dosage of one or more liquid products or both liquid and solid products wherein the dosing amount of at least one liquid product is measured by a weight cell. Moreover, dosing apparatus and dosing systems for applying those methods are provided. Additionally, the present invention refers to a method for washing textiles comprising a dosing step in which at least one of the inventive dosing methods, and/or at least one of the inventive dosing apparatus or dosing systems, respectively, are used.

26 Claims, 6 Drawing Sheets

(56) References Cited

U.S. PATENT DOCUMENTS

| | | | |
|---|---|---|---|
| 2,679,374 A * | 5/1954 | Mylting | 177/1 |
| 2,714,472 A * | 8/1955 | Richardson | 222/63 |
| 2,990,707 A * | 7/1961 | Gerhardt et al. | 68/12.18 |
| 3,091,327 A | 5/1963 | Lalley | |
| 3,136,157 A | 6/1964 | Seed et al. | |
| 3,197,980 A * | 8/1965 | Marple | 68/12.12 |
| 3,412,254 A | 11/1968 | Meyer-Doering et al. | |
| 3,447,906 A * | 6/1969 | Zimmerli | 422/75 |
| 3,526,334 A | 9/1970 | Ashton et al. | |
| 3,578,094 A | 5/1971 | Henry et al. | |
| 3,653,544 A | 4/1972 | Young et al. | |
| 3,656,478 A * | 4/1972 | Swersey | 604/66 |
| 3,743,598 A | 7/1973 | Field | |
| 3,754,871 A | 8/1973 | Hessel et al. | |
| 3,760,166 A | 9/1973 | Adams et al. | |
| 3,772,193 A | 11/1973 | Nelli et al. | |
| 3,774,056 A | 11/1973 | Sample et al. | |
| 3,796,349 A | 3/1974 | Weber | |
| 3,826,113 A | 7/1974 | Noraas et al. | |
| 3,826,408 A | 7/1974 | Berndt et al. | |
| 3,828,869 A | 8/1974 | Sellers | |
| 3,834,587 A * | 9/1974 | Bengt et al. | 222/595 |
| 4,040,515 A | 8/1977 | Hessel | |
| 4,046,996 A | 9/1977 | Williams et al. | |
| 4,076,146 A | 2/1978 | Lausberg et al. | |
| 4,195,500 A * | 4/1980 | Tobita et al. | 68/12.04 |
| 4,199,001 A | 4/1980 | Kratz | |
| 4,211,517 A | 7/1980 | Schmid | |
| 4,222,496 A * | 9/1980 | Start et al. | 222/16 |
| 4,241,400 A | 12/1980 | Kiefer | |
| 4,247,396 A | 1/1981 | Buesing | |
| 4,265,266 A | 5/1981 | Kierbow et al. | |
| 4,307,787 A | 12/1981 | Raboud et al. | |
| 4,320,855 A * | 3/1982 | Ricciardi et al. | 222/56 |
| 4,334,784 A * | 6/1982 | Engels | 366/76.3 |
| 4,353,482 A | 10/1982 | Tomlinson et al. | |
| 4,373,418 A | 2/1983 | Rhodes et al. | |
| 4,396,828 A | 8/1983 | Dino et al. | |
| 4,402,426 A | 9/1983 | Faulkner et al. | |
| 4,404,639 A | 9/1983 | McGuire et al. | |
| 4,433,917 A * | 2/1984 | Mendel et al. | 366/132 |
| 4,463,844 A | 8/1984 | Huffman et al. | |
| 4,482,785 A | 11/1984 | Finnegan et al. | |
| 4,486,910 A | 12/1984 | Saalmann et al. | |
| 4,509,543 A | 4/1985 | Livingston et al. | |
| 4,513,796 A * | 4/1985 | Miller et al. | 141/83 |
| 4,526,215 A * | 7/1985 | Harrison et al. | 141/83 |
| 4,573,606 A | 3/1986 | Lewis et al. | |
| RE32,101 E * | 4/1986 | Ricciardi et al. | 222/56 |
| RE32,102 E * | 4/1986 | Ricciardi et al. | 222/56 |
| 4,597,091 A | 6/1986 | Blake | |
| 4,630,654 A | 12/1986 | Kennedy, Jr. | |
| 4,632,198 A | 12/1986 | Uchimura | |
| 4,660,667 A | 4/1987 | Uchimura et al. | |
| 4,676,399 A | 6/1987 | Burckhardt | |
| 4,690,230 A | 9/1987 | Uchimura et al. | |
| 4,690,305 A | 9/1987 | Copeland | |
| 4,697,243 A | 9/1987 | Moore et al. | |
| 4,707,848 A | 11/1987 | Durston et al. | |
| 4,711,370 A | 12/1987 | Goudy, Jr. et al. | |
| 4,733,971 A | 3/1988 | Pratt | |
| 4,756,321 A | 7/1988 | Livingston et al. | |
| 4,766,548 A | 8/1988 | Cedrone et al. | |
| 4,770,859 A | 9/1988 | Heiser, Jr. | |
| 4,789,014 A * | 12/1988 | DiGianfilippo et al. | 141/83 |
| 4,826,661 A | 5/1989 | Copeland et al. | |
| 4,830,508 A * | 5/1989 | Higuchi et al. | 366/141 |
| 4,834,546 A | 5/1989 | Pütz | |
| 4,836,685 A * | 6/1989 | Verreault | 366/141 |
| 4,837,811 A | 6/1989 | Butler et al. | |
| 4,843,579 A | 6/1989 | Andrews et al. | |
| 4,845,965 A | 7/1989 | Copeland et al. | |
| 4,848,381 A | 7/1989 | Livingston et al. | |
| 4,858,449 A | 8/1989 | Lehn | |
| 4,867,196 A | 9/1989 | Zetena et al. | |
| 4,867,343 A | 9/1989 | Ricciardi et al. | |
| 4,872,763 A * | 10/1989 | Higuchi et al. | 366/152.1 |
| 4,908,190 A | 3/1990 | Maglio et al. | |
| 4,938,240 A | 7/1990 | Lakhan et al. | |
| 4,944,428 A | 7/1990 | Gmür | |
| 4,964,185 A | 10/1990 | Lehn | |
| 4,967,811 A * | 11/1990 | DiGianfilippo et al. | 141/83 |
| 4,969,011 A | 11/1990 | Faull et al. | |
| 4,974,646 A | 12/1990 | Martin et al. | |
| 4,976,137 A | 12/1990 | Decker et al. | |
| 4,980,292 A | 12/1990 | Elbert et al. | |
| 4,999,124 A | 3/1991 | Copeland | |
| 5,006,995 A | 4/1991 | Toschi et al. | |
| 5,014,211 A | 5/1991 | Turner et al. | |
| 5,014,877 A | 5/1991 | Roos | |
| 5,024,352 A | 6/1991 | Gmür et al. | |
| 5,036,479 A | 7/1991 | Prednis et al. | |
| 5,038,807 A | 8/1991 | Bailey et al. | |
| 5,038,973 A | 8/1991 | Gmür | |
| 5,040,699 A | 8/1991 | Gangemi | |
| 5,043,860 A | 8/1991 | Koether et al. | |
| 5,053,206 A | 10/1991 | Maglio et al. | |
| 5,064,094 A | 11/1991 | Roos et al. | |
| 5,115,842 A | 5/1992 | Crafts et al. | |
| 5,136,281 A | 8/1992 | Bonaquist | |
| 5,147,615 A | 9/1992 | Bird et al. | |
| 5,158,895 A | 10/1992 | Ashihara et al. | |
| 5,203,366 A | 4/1993 | Czeck et al. | |
| 5,208,930 A | 5/1993 | Chabard | |
| 5,219,224 A | 6/1993 | Pratt | |
| 5,222,027 A | 6/1993 | Williams et al. | |
| 5,240,326 A | 8/1993 | Evanson | |
| 5,268,153 A | 12/1993 | Muller | |
| 5,279,448 A | 1/1994 | Hanlin et al. | |
| 5,283,639 A | 2/1994 | Esch et al. | |
| 5,288,145 A * | 2/1994 | Mackey et al. | 366/141 |
| 5,294,022 A | 3/1994 | Earle | |
| 5,316,195 A | 5/1994 | Moksnes et al. | |
| 5,322,571 A | 6/1994 | Plummer et al. | |
| 5,332,311 A * | 7/1994 | Volk et al. | 366/134 |
| 5,332,312 A | 7/1994 | Evanson | |
| 5,340,211 A * | 8/1994 | Pratt | 366/141 |
| 5,345,379 A | 9/1994 | Brous et al. | |
| 5,369,032 A | 11/1994 | Pratt | |
| 5,370,267 A | 12/1994 | Schroeder | |
| 5,389,344 A | 2/1995 | Copeland et al. | |
| 5,390,385 A * | 2/1995 | Beldham | 8/158 |
| 5,397,028 A | 3/1995 | Jesadanont | |
| 5,400,018 A | 3/1995 | Scholl et al. | |
| 5,404,893 A | 4/1995 | Brady et al. | |
| 5,407,598 A | 4/1995 | Olson et al. | |
| 5,411,716 A | 5/1995 | Thomas et al. | |
| 5,419,355 A | 5/1995 | Brennan et al. | |
| 5,427,748 A | 6/1995 | Wiedrich et al. | |
| 5,497,914 A | 3/1996 | Maltsis | |
| 5,500,050 A | 3/1996 | Chan | |
| 5,505,915 A | 4/1996 | Copeland et al. | |
| 5,556,478 A | 9/1996 | Brady et al. | |
| 5,558,435 A | 9/1996 | Marjo | |
| 5,580,448 A | 12/1996 | Brandreth | |
| 5,581,982 A | 12/1996 | Schroeder et al. | |
| 5,584,025 A | 12/1996 | Keithley et al. | |
| 5,584,079 A | 12/1996 | Wong et al. | |
| 5,609,417 A | 3/1997 | Otte | |
| 5,619,183 A | 4/1997 | Ziegra et al. | |
| 5,625,659 A | 4/1997 | Sears | |
| 5,625,908 A | 5/1997 | Shaw | |
| 5,632,411 A | 5/1997 | Harty et al. | |
| 5,636,008 A | 6/1997 | LoBiondo et al. | |
| 5,638,417 A | 6/1997 | Boyer et al. | |
| 5,653,269 A | 8/1997 | Miller et al. | |
| 5,671,262 A | 9/1997 | Boyer et al. | |
| 5,679,173 A | 10/1997 | Hartman | |
| 5,681,400 A | 10/1997 | Brady et al. | |
| 5,694,323 A | 12/1997 | Koropitzer et al. | |
| 5,695,091 A | 12/1997 | Winings et al. | |
| 5,724,261 A | 3/1998 | Denny et al. | |
| 5,745,381 A | 4/1998 | Tanaka et al. | |
| 5,757,664 A | 5/1998 | Rogers et al. | |

(56) References Cited

U.S. PATENT DOCUMENTS

| | | |
|---|---|---|
| 5,758,300 A | 5/1998 | Abe |
| 5,759,501 A | 6/1998 | Livingston et al. |
| 5,761,278 A | 6/1998 | Pickett et al. |
| 5,762,096 A | 6/1998 | Mirabile |
| 5,769,536 A | 6/1998 | Kotylak |
| 5,777,895 A | 7/1998 | Kuroda et al. |
| H1743 H | 8/1998 | Graves et al. |
| 5,821,523 A | 10/1998 | Bunte et al. |
| 5,826,749 A | 10/1998 | Howland et al. |
| 5,827,486 A | 10/1998 | Crossdale |
| 5,839,097 A | 11/1998 | Klausner |
| 5,851,291 A | 12/1998 | Poterala et al. |
| 5,861,881 A | 1/1999 | Freeman et al. |
| 5,864,783 A | 1/1999 | Struck et al. |
| 5,875,430 A | 2/1999 | Koether |
| 5,885,446 A | 3/1999 | McGrew, Jr. |
| 5,887,975 A | 3/1999 | Mordaunt et al. |
| 5,897,671 A | 4/1999 | Newman et al. |
| 5,902,749 A | 5/1999 | Lichtwardt et al. |
| 5,913,915 A | 6/1999 | McQuinn |
| 5,931,877 A | 8/1999 | Smith et al. |
| 5,933,479 A | 8/1999 | Michael et al. |
| 5,938,074 A | 8/1999 | Dartus |
| 5,939,974 A | 8/1999 | Heagle et al. |
| 5,945,910 A | 8/1999 | Gorra |
| 5,956,487 A | 9/1999 | Venkatraman et al. |
| 5,961,561 A | 10/1999 | Wakefield, II |
| 5,967,202 A | 10/1999 | Mullen et al. |
| 5,973,696 A | 10/1999 | Agranat et al. |
| 5,974,345 A | 10/1999 | Buck et al. |
| 5,975,352 A | 11/1999 | Spriggs et al. |
| 5,979,703 A | 11/1999 | Nystrom |
| 5,980,090 A | 11/1999 | Royal et al. |
| 5,987,105 A | 11/1999 | Jenkins et al. |
| 5,992,686 A | 11/1999 | Cline et al. |
| 6,003,070 A | 12/1999 | Frantz |
| 6,007,788 A | 12/1999 | Bellon et al. |
| 6,012,041 A | 1/2000 | Brewer et al. |
| 6,029,286 A | 2/2000 | Funk |
| 6,049,792 A | 4/2000 | Hart et al. |
| 6,061,668 A | 5/2000 | Sharrow |
| 6,073,124 A | 6/2000 | Krishnan et al. |
| 6,082,149 A | 7/2000 | Woods |
| 6,098,843 A | 8/2000 | Soberanis et al. |
| 6,120,175 A * | 9/2000 | Tewell .................. 366/140 |
| 6,129,449 A | 10/2000 | McCain et al. |
| 6,133,555 A | 10/2000 | Brenn |
| 6,136,184 A | 10/2000 | King |
| 6,143,257 A | 11/2000 | Spriggs et al. |
| 6,164,189 A | 12/2000 | Anson |
| 6,167,358 A | 12/2000 | Othmer et al. |
| 6,220,312 B1 | 4/2001 | Hirsch et al. |
| 6,234,218 B1 * | 5/2001 | Boers .................. 141/83 |
| 6,249,778 B1 | 6/2001 | Vaghi |
| 6,259,956 B1 | 7/2001 | Myers et al. |
| 6,269,975 B2 | 8/2001 | Soberanis et al. |
| 6,321,204 B1 | 11/2001 | Kazami et al. |
| 6,330,499 B1 | 12/2001 | Chou et al. |
| 6,356,205 B1 | 3/2002 | Salvo et al. |
| 6,357,292 B1 | 3/2002 | Schultz et al. |
| 6,370,454 B1 | 4/2002 | Moore |
| 6,377,868 B1 | 4/2002 | Gardner, Jr. |
| 6,380,495 B1 * | 4/2002 | Ash et al. .................. 177/116 |
| 6,418,371 B1 | 7/2002 | Arnold |
| 6,438,471 B1 | 8/2002 | Katagishi et al. |
| 6,441,322 B1 * | 8/2002 | Ash et al. .................. 177/116 |
| 6,463,940 B1 | 10/2002 | Thomas et al. |
| 6,472,615 B1 | 10/2002 | Carlson |
| 6,490,513 B1 | 12/2002 | Fish et al. |
| 6,507,966 B1 * | 1/2003 | Mitchell et al. .............. 8/158 |
| 6,513,964 B1 * | 2/2003 | Himmelright et al. ........ 366/141 |
| 6,547,097 B1 | 4/2003 | Cavallaro et al. |
| 6,561,381 B1 | 5/2003 | Osterheld et al. |
| 6,697,706 B2 | 2/2004 | Gardner, Jr. |
| 6,707,873 B2 | 3/2004 | Thompson et al. |
| 6,719,453 B2 * | 4/2004 | Cosman et al. .............. 366/141 |
| 6,792,395 B2 | 9/2004 | Roberts |
| 6,845,298 B2 * | 1/2005 | Nelson et al. .............. 700/265 |
| 6,896,140 B1 | 5/2005 | Perry |
| 6,921,000 B2 | 7/2005 | Wagner et al. |
| 6,987,228 B1 | 1/2006 | MacMichael et al. |
| 7,069,188 B2 | 6/2006 | Roberts |
| 7,128,215 B2 | 10/2006 | Danechi |
| 7,175,048 B2 | 2/2007 | Wolfschaffner |
| 7,201,290 B2 | 4/2007 | Mehus et al. |
| 7,228,990 B2 | 6/2007 | Schmidt |
| 7,410,623 B2 | 8/2008 | Mehus et al. |
| 7,530,729 B2 | 5/2009 | O'Callaghan |
| 7,891,523 B2 | 2/2011 | Mehus et al. |
| 2001/0023841 A1 | 9/2001 | Zimmerman et al. |
| 2001/0038018 A1 | 11/2001 | Bell et al. |
| 2001/0039501 A1 | 11/2001 | Crevel et al. |
| 2001/0047214 A1 | 11/2001 | Cocking et al. |
| 2001/0049846 A1 * | 12/2001 | Guzzi et al. .................. 8/158 |
| 2001/0053939 A1 | 12/2001 | Crevel et al. |
| 2001/0054038 A1 | 12/2001 | Crevel et al. |
| 2002/0014496 A1 | 2/2002 | Cline et al. |
| 2003/0031084 A1 * | 2/2003 | Bartos .................. 366/141 |
| 2003/0033156 A1 | 2/2003 | McCall |
| 2003/0033396 A1 | 2/2003 | McCall |
| 2003/0043688 A1 | 3/2003 | Peterson et al. |
| 2003/0121561 A1 * | 7/2003 | Wagner et al. .............. 141/9 |
| 2003/0155035 A1 | 8/2003 | Ichikawa et al. |
| 2003/0195656 A1 | 10/2003 | Gardner, Jr. et al. |
| 2004/0015269 A1 | 1/2004 | Jungmann et al. |
| 2004/0088076 A1 | 5/2004 | Gardner, Jr. et al. |
| 2004/0162850 A1 | 8/2004 | Sanville et al. |
| 2004/0216500 A1 * | 11/2004 | Aouad .................. 68/17 R |
| 2004/0220844 A1 | 11/2004 | Sanville et al. |
| 2004/0226755 A1 | 11/2004 | Pottebaum et al. |
| 2004/0226956 A1 | 11/2004 | Brooks |
| 2004/0226959 A1 | 11/2004 | Mehus et al. |
| 2004/0230339 A1 | 11/2004 | Maser et al. |
| 2004/0232163 A1 | 11/2004 | Reinsch et al. |
| 2004/0245284 A1 | 12/2004 | Mehus et al. |
| 2005/0065644 A1 | 3/2005 | Gardner, Jr. et al. |
| 2005/0072793 A1 | 4/2005 | Mehus et al. |
| 2005/0102059 A1 | 5/2005 | Gardner, Jr. et al. |
| 2005/0144737 A1 * | 7/2005 | Roepke et al. .............. 8/158 |
| 2005/0269348 A1 | 12/2005 | Limback et al. |
| 2006/0173576 A1 | 8/2006 | Goerg et al. |
| 2007/0000291 A1 * | 1/2007 | France et al. .............. 68/12.18 |
| 2007/0154370 A1 | 7/2007 | Mehus et al. |
| 2008/0271928 A1 | 11/2008 | Mehus et al. |
| 2008/0283145 A1 | 11/2008 | Maxwell |
| 2009/0037026 A1 | 2/2009 | Sostaric et al. |
| 2009/0090564 A1 | 4/2009 | Kresina |
| 2009/0126123 A1 * | 5/2009 | Kim et al. .................. 8/137 |
| 2009/0151474 A1 | 6/2009 | Mehus et al. |
| 2009/0171502 A1 | 7/2009 | Freidin |
| 2009/0294469 A1 | 12/2009 | Poulain et al. |

FOREIGN PATENT DOCUMENTS

| | | | |
|---|---|---|---|
| DE | 10016659 | 10/2001 | |
| DE | 100 39 408 A1 | 12/2001 | |
| EP | 0917906 A1 | 5/1999 | |
| GB | 2052251 A1 | 5/1980 | |
| GB | 2120563 A * | 12/1983 | ............. B01F 15/04 |
| JP | 59142832 A * | 8/1984 | ............. B01F 15/04 |
| JP | 60020122 A * | 2/1985 | ............. G01G 17/04 |
| JP | 60150823 A * | 8/1985 | ............. B01F 15/04 |
| JP | 61098657 A * | 5/1986 | ............. B60S 1/48 |
| JP | 62168529 A * | 7/1987 | ............. B01F 15/04 |
| JP | 63001434 A * | 1/1988 | ............. B01F 15/04 |
| JP | 01145525 A * | 6/1989 | ............. G01F 11/00 |
| JP | 01148916 A * | 6/1989 | ............. G01F 11/00 |
| JP | 01207124 A * | 8/1989 | ............. B01F 15/04 |
| JP | 04049110 A * | 2/1992 | ............. B65G 43/08 |
| JP | 06226068 | 8/1994 | |
| JP | 09066995 | 3/1997 | |
| JP | 09066999 | 3/1997 | |
| JP | 11-502932 | 3/1999 | |
| JP | 11156101 | 6/1999 | |

(56) References Cited

FOREIGN PATENT DOCUMENTS

| WO | 98/26704 | 6/1998 |
|----|----------|--------|
| WO | 03/059143 | 7/2003 |
| WO | 2006133026 A2 | 12/2006 |

OTHER PUBLICATIONS

Office Action from U.S. Appl. No. 12/567,266, dated Jun. 20, 2011, 13 pp.
Response to Office Action dated Jun. 20, 2011, from U.S. Appl. No. 12/567,266, filed Sep. 20, 2011, 10 pp.
Office Action from U.S. Appl. No. 11/799,692, dated Jul. 22, 2011, 15 pp.
Office Action from U.S. Appl. No. 12/567,266, dated Feb. 2, 2012, 14 pp.
Response to Office Action dated Dec. 9, 2011, from U.S. Appl. No. 11/799,692, Mar. 9, 2012, 6 pp.
Response to Office Action dated Nov. 29, 2012, from U.S. Appl. No. 12/683,666, filed Jan. 29, 2013, 8 pp.
Notice of Allowance from U.S. Appl. No. 12/711,892, dated Feb. 2, 2011, 9 pp.
Office Action from U.S. Appl. No. 11/799,692, dated Feb. 3, 2011, 13 pp.
Response to Office Action dated Feb. 3, 2011, from U.S. Appl. No. 11/799,692, filed May 3, 2011, 8 pp.
Office Action from U.S. Appl. No. 11/713,964, dated Jul. 7, 2010, 8 pp.
Response to Office Action dated Jul. 7, 2010, from U.S. Appl. No. 11/713,964, filed Oct. 6, 2010, 7 pp.
Response to Office Action dated Aug. 21, 2012, from U.S. Appl. No. 12/683,666, filed Nov. 20, 2012, 7 pp.
Response to Office Action dated Aug. 29, 2012, from U.S. Appl. No. 12/567,266, filed Nov. 28, 2012, 10 pp.
Office Action from U.S. Appl. No. 12/683,666, dated Aug. 21, 2012, 8 pp.
Office Action from U.S. Appl. No. 12/567,266, dated Aug. 29, 2012, 17 pp.
Nova Controls, Nova News, "Save Money and Gain Sales Features?" Aug. 12, 1992, 1 pg.
NOVALINK™ OverView™ Program Pricing, undated, 1 pg.
Nova Controls, "Orion Liquid Laundry Supply Dispenser," Feb. 1989, 5 pp.
NOVALINK™ Laundry Information System, ControlMaster Version 2.0 for Windows User's Guide, 2000, 39 pp.
Persyst Inc., "LDAS-2000 Remote Information Control and Management System for the Commercial Laundry and Vending Industry," undated, 4 pp.
Persyst Inc., "Dial-A-Wash Automatic Laundry Room Attendant For Apartment and Complex Laundry Rooms," undated, 2 pp.
PowerPoint Presentation: "ECOLAB® Aramark Uniform Services Joining Forces for Service Excellence," 1998, 69 pp.
T-JET™ 2000 PC, "Wash-Aisle Productivity Manager Software Guide," ECOLAB® Textile Care Division, undated, 29 pp.
Sample Reports, Nova Controls, Oct. 1997, 8 pp.
Sample Reports, NOVALINK™ System, Jan. 1996, 9 pp.
NEXGEN SI, Inc., "*InTouch* Water Treatment Information Management Solution," Mar. 29, 1999, 59 pp.
NOVALINK™ brochure: "Laundry Information System: Overview Reports," Dec. 13, 1995, 6 pp.
Diversey, Diverlog-L Enhanced "DLE—Production Summary Reports," Apr. 1990, 5 pp.
Diversey, Diverlog-L Enhanced "DLE Set-up Report," Apr. 1990, 7 pp.
Diversey, Diverlog-L Enhanced "DLE—Single Cycle Reports," Mar. 1990, 5 pp.
Clax Diverflow System, "Advanced Central Dosing Technology For Laundries" copyright DiverseyLever 1998, 3 pp.
ECOLAB® Inc., product brochure: "We'd like to make a couple of things perfectly clear," copyright 1998, 4 pp.
ECOLAB® Balancer. Com, MRE, Jun. 4, 1997, 4 pp.
ECOLAB® Inc., product brochure: "Relax. We've Got Your Pool Concerns Under Control," copyright 1998, 4 pp.
Office Action dated Aug. 14, 2007, for U.S. Appl. No. 10/436,454, 5 pp.
Notice of Allowance mailed Nov. 29, 2007, for U.S. Appl. No. 10/436,454, 7 pp.
Office Action dated May 2, 2008, for U.S. Appl. No. 10/436,454, 6 pp.
Office Action dated Oct. 28, 2008, for U.S. Appl. No. 10/436,454, 6 pp.
Office Action dated Mar. 20, 2009, for U.S. Appl. No. 10/436,454, 7 pp.
Office Action dated Oct. 22, 2009, for U.S. Appl. No. 10/436,454, 8 pp.
Office Action dated Feb. 17, 2009, for U.S. Appl. No. 11/954,425, 13 pp.
Office Action dated Sep. 21, 2009, for U.S. Appl. No. 11/954,425, 17 pp.
Notice of Allowance mailed Dec. 17, 2009, for U.S. Appl. No. 11/954,425, 6 pp.
Office Action dated Jul. 24, 2007, for U.S. Appl. No. 10/843,230, 16 pp.
Office Action dated Nov. 28, 2007, for U.S. Appl. No. 10/843,230, 18 pp.
Office Action dated Jun. 17, 2008, for U.S. Appl. No. 10/843,230, 14 pp.
Office Action dated Sep. 4, 2008, for U.S. Appl. No. 10/843,230, 11 pp.
Office Action dated Mar. 27, 2009, for U.S. Appl. No. 10/843,230, 9 pp.
Office Action dated Nov. 2, 2009, for U.S. Appl. No. 10/843,230, 10 pp.
Office Action dated Jan. 19, 2010, for U.S. Appl. No. 10/843,230, 7 pp.
Office Action dated Jul. 24, 2007 for U.S, Appl. No. 10/843,219, 12 pp.
Office Action dated Jan. 10, 2008 for U.S. Appl. No. 10/843,219, 16 pp.
Notice of Allowance dated May 1, 2008 for U.S. Appl. No. 10/843,219, 8 pp.
U.S. Appl. No. 12/711,892, filed Feb. 24, 2010, entitled "Low and Empty Product Detection Using Load Cell and Load Cell Bracket".
U.S. Appl. No. 12/567,266, filed Sep. 25, 2009, entitled "Make-Up Dispense in a Mass Based Dispensing System".
Final Office Action from U.S. Appl. No. 12/683,666, dated Nov. 29, 2012, 6 pp.
Office Action from U.S. Appl. No. 10/436,454, dated Apr. 21, 2010, 15 pp.
Response to Office Action dated Apr. 21, 2010, from U.S. Appl. No. 10/436,454, filed Jun. 21, 2010, 16 pp.
Response to Office Action dated Feb. 2, 2012, from U.S. Appl. No. 12/567,266, filed May 2, 2012, 5 pp.
Response to Office Action dated Jul. 22, 2011, from U.S. Appl. No. 11/799,692, Oct. 24, 2011, 6 pp.
Decision on Appeal from U.S. Appl. No. 10/436,454, dated Jul. 17, 2013, 14 pp.

* cited by examiner

METHOD FOR MULTIPLE DOSAGE OF LIQUID PRODUCTS, DOSING APPARATUS AND DOSING SYSTEM

The present invention refers to a method for multiple dosage of one or more liquid products, optionally additionally in combination with one or more solid products, as well as to a dosing apparatus and a dosing system in which said method may be applied.

Generally, when dosing liquid products, the dosing amount is measured by a time/amount dosing method, especially in the field of industrial textile care, like for example in commercial laundries, and of industrial dishwashing. Using said dosing method, the dosing device is at first calibrated such that the time required to feed a specific amount of the liquid product to be dosed is determined. After having calibrated the dosing device any dosing amount for this specific liquid product can be measured by at first calculating the time which is expected to be required for dosing the desired amount using the time/amount ratio determined by the calibration. Then, the feeding of the liquid product is to be started and stopped after the calculated dosing time has elapsed. The liquid product may be transferred either directly into the application device, such as a washing machine or a dishwasher, or into an intermediate vessel, for example for mixing several products before they are transferred together into the application device.

However, such a procedure has several disadvantages. Because of their different physical properties the time/amount calibration has to be carried out separately for each liquid product supposed to be dosed. Of course, this is connected with much effort before even beginning with the dosage.

Additionally, the actually dosed amount can not be determined by this method. However, in some application fields such as the commercial washing of textiles used in hospitals or in the food producing or processing industry, it is necessary to exactly specify the amount of certain detergents used for a particular washing cycle. In particular, this guarantees a defined antibacterial or disinfective effect.

Moreover, the actually dosed amount of the liquid product may differ from the expected one without being noticed or even detectable. This is because some physical properties of the liquid product like i.a. its temperature or its viscosity as well as the kind of pump used or the mechanical load of the pump affect the amount of the liquid product fed in a specific time. Accordingly, the actual dosing condition may deviate from the one of the calibration measurement, for instance the viscosity of the liquid product is different due to mixture irregularities. This may result in the actually dosed amount being lower than expected or calculated, respectively. As a consequence, the intended effect achieved by the dosed liquid product in the application may be reduced, for example the antibacterial or disinfective effect as well as the washing or cleaning performance.

Furthermore, the dosage may become more and more inaccurate with an increasing number of dosages since some machine parts such as hoses, membranes or seals which are for example contained in the feeding devices such as pumps, are submitted to wear and may change the feeding conditions. This as well results in a possible reduction of the actual dosing amount in comparison with the calculated one.

EP 0 917 906 B1 describes the use of a weighing device to dose a solid detergent which is further dissolved to prepare a detergent solution. Therein, the solid detergent is fed into a vessel the weight of which is determined by a weighing device. If the amount of the solid detergent which is required to prepare a detergent solution with a defined concentration, is reached the feeding of said solid detergent into the vessel is stopped and a solvent like water is added to provide the desired detergent solution. Said detergent solution is supposed to be stored in the vessel and gradually discharged into a washing machine if needed.

However, this method for dissolving a specific amount of a detergent only refers to solid detergents. The dosage of the obtained liquid detergent solution is not mentioned and accordingly the dosage proceeds by methods known in the state of the art, like a time/amount dosing method as described above. Moreover, the above described method is only appropriate for dosing one detergent. In practice, because of their different physical and chemical properties, generally the methods and apparatus used for dosing solid products do not apply for the dosage of liquid products.

Accordingly, the object underlying the present invention is to provide a method for an easy, multiple dosage of liquid products, which is sufficiently accurate and allows an exact measurement of the actually dosed amount. Moreover, the method should be easily adapted to dosing more than one liquid products and, preferably, even to a combination of dosing liquid and solid products. A further object is to provide an apparatus in which the method can be applied.

The above objects are solved by a method for a multiple dosage of a liquid product wherein the dosing amount of said liquid product is measured by a weight cell in each dosing cycle. The dosing amount of the liquid product can be either identical with or different from the dosing amount of a preceding or following dosing cycle, i.e. the dosing amount can differ in each of the dosing cycles.

Although it is also possible that each of the following preferred embodiments of the present method are mechanically realized, it is especially preferred to control the dosing process completely or at least in parts by a programmable logic control (PLC). In particular, this is advantageous since the required data, for example for several washing programs of a washing machine or a dishwasher or which are otherwise required in the dosing cycle, can be preset, which ensures a great application variety and facilitates automation of the dosing process. The number of dosing cycles corresponding to the number of products to be dosed within a specific dosing programme generally is not limited and depends on the capacity of the PLC. Preferably, the number of dosing cycles should not exceed 50, more preferred it should not exceed 25 dosing cycles.

The liquid product should have a consistency such that it can be transported through a dosing device by means which are known in the state of the art. Accordingly, it is also possible to dose paste-like products as long as an essential free-flow of the product in the dosing device is ensured. The liquid product may be a pure substance as well as a mixture of products and preferably should be provided in one phase.

In a preferred embodiment, the liquid product represents an ingredient commonly used in processes for washing textiles, especially in commercial laundries, or in a dishwasher. Typical ingredients for washing textiles are exemplified by oxidants, softeners, acids, re-treatment agents, anti-chlorinating agents, surfactant booster, starches, alkali enhancing products, detergents or chlorine containing solutions.

The weight cell corresponds to the ones known in the art. The value of the weight may either be determined and transmitted electronically or it may as well be obtained by reading or be indicated mechanically. It is preferred to determine the weight electronically to enable the dosing process to be automated.

The dosing amount can be easily measured if the liquid product is fed into a vessel the weight of which, including the substances contained therein, is determined by the weight cell. It has to be provided for the vessel to not be weighted by other parts of the dosing apparatus, which could falsify the measured weight of the vessel.

In an automatized dosing process which is preferred, the feeding of the liquid product advantageously is initialised by transmitting a starting signal for example from a washing machine or a dishwasher to the PLC, which starts a dosing program preset therein and results in inducing the feeding process. However, it is also possible to initiate the feeding mechanically or manually.

The feeding than preferably proceeds until the desired dosage of the liquid product and/or the maximum filling volume of the vessel is reached. In the latter case, the weight of the vessel filled with the liquid product and optionally other substances up to its maximum filling volume has to be calculated before to be able to halt the feeding at the moment in which the vessel is actually filled up to his maximum filling volume by means of measurement of the vessel's weight. This is especially relevant in case that the dosing amount corresponds to a larger volume than is made available by the volume of the vessel, that is the dosing cycle comprises at least two dosing steps.

The feeding of the liquid product can be performed by means which are commonly known from the state of the art. The easiest realization takes advantage of the gravitation. However, mechanical means like all kinds of pumps are particularly preferred.

The pump preferably controls one or more of the feeding line, the excess and/or discharge of the vessel, the weight cell, one or more delivery devices for transporting the dosed liquid products through the dosing line, the access to one or more application devices, the feeding of other substances like diluents and/or solvents and apparative devices of one or more other dosing lines.

The weight of the fed liquid product preferably is continuously measured through the weight cell while the liquid product is fed into the vessel by continuously determining the weight of said vessel including the substances contained therein. This ensures a prompt reaction if a predetermined value of the weight which is supposed to induce further controlling activities, is reached.

It is especially preferred that the continuously determined value of the vessel's weight, including the substances contained therein, is transmitted online from the weight cell to the PLC.

In an advantageous embodiment the halt of the feeding of the liquid product is initiated as soon as the determined value of the weight of the vessel including fed liquid product and optionally other substances reaches a predetermined value. The most comfortable realization proceeds through a PLC. Generally, the predetermined value indicates that the desired dosing amount for the liquid product and/or the maximum filling volume of the vessel is reached as described above.

After the halt of the feeding the content of the vessel preferably is discharged and a further dosing cycle can be initiated. Generally, the discharging process proceeds by flushing the vessel with an appropriate solvent or using common mechanical delivery devices like pumps. It is as well possible to take advantage of the gravitation to discharge the vessel or to use other methods known in the art.

Depending on the desired application the dosed amount of the liquid product may either be directly transferred to the application device like for example into a washing machine or a dishwasher, which instantly consumes the above weighed out amount of liquid product. Additionally, it is also possible that the discharged dosed liquid product is transferred into an intermediate storing vessel first in which it may be stored until it is utilized, into a mixing vessel in which it may be combined with other substances to produce a blend use product which afterwards is further transferred to the application device, or to a packaging device if the dosing location is not identical with the use location.

It is preferred that the dosing amount is directly consumed in a washing machine or a dishwasher which is connected to the dosing line. The dosing line may as well be connected to several application devices like said washing machines or dishwashers such that successively weighed out dosing amounts can be discharged and transferred to several machines i.e. either the same or a different machine, just as the client desires. By using a PLC it is for example possible to roll in a kind of time schedule according to which certain dosing amounts are weighed out as described above at a predetermined time and discharged to a predetermined washing machine or dishwasher.

As mentioned above the vessel may contain further substances beside the liquid product to be dosed. In a particularly preferred embodiment before feeding the liquid product a predetermined amount of one or more liquid diluents and/or solvents is fed into the vessel. The amount of the solvent to be fed into the vessel is dosable for example by the inventive weighing method but as well by any common dosing method such as the time/amount dosing method.

The kind of the solvent is not especially restricted provided that it dilutes and/or dissolves the liquid product, is compatible with the liquid product and is appropriate to be used in the supposed application. Depending on the liquid product to be dosed a blend of solvents may be most appropriate. It is also possible that the solvent additionally contains any additives like solutizers or other common additives provided that they are soluble and that they do not interfere in the supposed application.

In case that the liquid product represents one ingredient for a washing or cleaning cycle in a washing machine or a dishwasher the liquid solvent preferably is water. Diluting/dissolving the liquid product which is supposed to be dosed helps to prevent that a residue remains in the vessel after discharging due to high product concentrations. This would lead to inaccurate dosing amounts. Liquid products used in washing or cleaning processes should be provided in a concentration of from 2 to 20 wt.-%, preferably 5 to 15 wt.-% and most preferred 10 wt.-% based on the aqueous product solution. Preferably, the solvent as well functions as a medium for rinsing the vessel and/or transporting the liquid product through the dosing line to the application device.

In a preferred embodiment the vessel is equipped with a mixing device like a magnetic or mechanical stirrer to facilitate the dissolving of the liquid product in the solvent.

In an especially preferred embodiment additionally the time required to feed the liquid product until the desired dosing amount and/or the maximum filling volume of the vessel is reached is measured.

Said measurement has several advantages. On one hand it may be helpful in cases in which the volume of the vessel is not sufficient to dose the desired amount of the liquid product in one weighing step. In those cases it is not necessary to use the weighing method mentioned above for the dosage of the remaining amount of the liquid product after the content of the vessel is discharged. Since the determined feeding time functions as a calibration the remaining amount of said liquid product to be dosed can easily be measured according to the time/amount dosing method.

The accuracy of this dosing method is increased in comparison with the method generally applied as in the present measurement the conditions are identical. Especially, the wear of the apparatus used is not of relevance in this case because it can be expected that the wear does not change within the short period between the weighing measurement and the following time/amount measurement.

Although generally not limited, to reduce the total dosing time the number of dosing steps within a dosing cycle for dosage of one product should not be too high, and should not exceed 5 steps, preferably 3 steps and most preferred 2 steps. Preferably, a vessel with a larger maximum filling volume should be provided if possible with respect to the apparative requirements. After the dosage is completed a further dosing cycle for the same or another product may be initiated.

On the other hand measuring the feeding time allows a comparison of the actual feeding time with the ones of former dosing cycles of the same liquid product. These may for example be saved on a PLC, preferably additionally in form of the time/amount ratio to be able to easily calculate the expected time in case that the dosed amounts differ in the corresponding dosing cycles. If the actual measured time differs to a larger extent than a predetermined standard deviation from the expected time with respect to the former dosing cycles of the same product a signal will be induced. This signal indicates that the process does not run regularly, for example due to worn out material which has to be changed or any kind of leak in the system, or defects in the pump.

Moreover, in case that the dosed amount of the liquid product is used for instance to wash textiles for which a specific cleaning performance or antibacterial or disinfective effect has to be proven by specifying the exact amount of a particular washing ingredient such a signal indicates that the requirements might not have been fulfilled and helps identifying the corresponding load which has to be re-washed.

In an especially preferred embodiment a method for multiple dosage of a liquid product comprises the following steps:
  a. starting the dosing cycle by initialising a dosing program rolled in a PLC,
  b. optionally at first feeding a preset amount of one or more liquid diluents and/or solvents into a vessel,
  c. feeding the liquid product into the vessel,
  d. continuously determining the weight of the vessel during the dosing cycle by a weight cell and continuously transmitting the value of said weight online from the weight cell to the PLC, wherein the determined weight includes the weight of any substance contained in the vessel,
  e. inducing the halt of the feeding of the liquid product by the PLC as soon as the value of the measured weight of the vessel according to step d) reaches a predetermined value,
  f. discharging the content of the vessel, optionally to an application device directly consuming the weighed out liquid product, and repeating steps a) to f) directly after the discharge or later.

As described above preferably the predetermined value in step e) indicates that the desired dosing amount for the liquid product and/or the maximum filling volume of the vessel is reached. It is also possible that the time required to feed the liquid product until the desired dosing amount and/or the maximum filling volume of the vessel is reached is measured. The uses of the determined feeding time are analogous to what is described above.

In case that several dosing steps are necessary for one liquid product because the volume of the vessel is not sufficient for the total amount of the liquid product or its solution, step f) above may be followed by further dosing steps using the above measured feeding time as calibration comprising
  g) optionally at first feeding a preset amount of one or more liquid diluents and/or solvents into a vessel,
  h) feeding the liquid product into the vessel,
  i) inducing the halt of the feeding of the liquid product by the PLC as soon as the time calculated from the feeding time is reached,
  j) discharging the content of the vessel, optionally to an application device directly consuming the weighed out liquid product, and
  repeating steps g) to j) directly after the discharge until the desired total amount of the liquid product is reached.

In a further aspect of the invention a method for multiple dosage of two or more liquid products is provided wherein at least one liquid product is dosed by the weighing method described above. It is also possible that each of said liquid products is dosed according to the inventive method. The two or more further liquid products can be dosed in successive dosing cycles by one common dosing program. Moreover, they can be dosed totally separate from each other by different dosing programs.

In a preferred embodiment after having dosed the first liquid product according to the inventive method, the following liquid product to be dosed by the same way, which following product is different from the preceding dosed liquid product, may be fed into the vessel after the preceding liquid product has been discharged from the vessel. In this case it is prevented that the liquid products to be dosed get into direct contact with each other.

However, it has to be born in mind, that depending on the apparative assembly it is also possible that both products indirectly get into contact with each other. This can occur if the products after having been dosed are discharged through a hose together with a solvent such as water which is also used to rinse the vessel. However, both products still can get into contact with each other by diffusion of said product through a kind of solvent barrier which separates one dosed and discharged product from another, depending on the distance of the application device, like a washing machine or a dishwasher, from the dosing unit.

In case that the two products to be dosed one after the other are not compatible with each other the contact strictly has to be avoided. This can be realized for example by optimising the apparative assembly, for instance by choosing an appropriate hose length in relation to the volume of the dosing amount or by integrating further mechanical barriers into the apparative assembly, like valves, which do not permit any contact. The discharging procedure may as well be adapted for example by choosing such an amount of a liquid medium which rinses the vessel and transfers the dosed product to the application device that the first dosed product already has already arrived and optionally even consumed in the application device before the following dosing cycle is initiated.

In a further preferred embodiment one or more of the following liquid products to be dosed according to the inventive method, which following product(s) is(are) different from the preceding dosed liquid product already dosed, is(are) fed into the vessel while the preceding liquid product is still contained therein. Of course this is only applicable if all the products which are dosed together in the vessel are compatible with each other. The resulting mixture may then be transferred to the application device as a whole.

A further embodiment provides a method in which the two or more liquid products are dosed through more than one dosing lines, which facilitates the dosage of products which are not compatible with each other. The single dosing lines may be controlled by a common PLC. It is also possible that two or more groups of dosing lines are each controlled by separate PLC's wherein each group of dosing lines comprises one or more dosing lines.

Depending on the kinds of products to be dosed and the demands made with respect to the accuracy of their dosages it is possible that the dosage in each of said dosing lines proceeds by the inventive method. It is also possible that the dosing in at least one of said dosing lines proceeds by the inventive method and the dosage in at least one further dosing line proceeds by one or more other dosing methods.

Other dosing methods are exemplified by the time/amount dosing method and/or a method using conductivity measurements of the liquid products or their solutions. Other methods which are known in the art may also be applied.

In one especially preferred embodiment each of the dosing lines has a separate access to one or more application devices which consume the dosed liquid products discharged to them from the vessel. This is in particular useful if at least some of the liquid products in each of the dosing lines are completely or in part not compatible with each other. When using several dosing lines but a common access to one or more application devices at this point a contact of the respective liquid products may occur which is supposed to be prevented. Moreover, a separate access to the application device(s) helps to reduce the time required to dose a larger number of products. Otherwise the total dosing time for all products to be dosed corresponded to the sum of the dosing times of each product.

Moreover, the present invention provides a method for dosing one or more liquid products and one or more solid products wherein the dosage of the one or more liquid products proceeds either by the inventive weighing method alone or by a combination of weighing methods as described above. With respect to the dosage of the solid product it is possible to use a completely separate dosing line or as well to provide for a connection of the dosing line of the solid product with at least one of the lines used to dose a liquid product. Preferably the dosage of the solid product proceeds by common dosing methods through a dosing line which is connected to one of the liquid dosing lines, more preferred to the dosing line which is reserved for alkaline products. The liquid products may be dosed through one or more dosing lines as described above.

The above described inventive dosing methods may be used in any kind of process in which at least one liquid product has to be dosed, and especially in a process in which dosing has to proceed very accurately and the dosing amount has to be documented. Preferably, the methods are used in a process for washing textiles, like the ones accumulated in hospitals or in the food producing or processing industry, especially in commercial laundries, and/or for warewashing.

Additionally, the present invention provides a dosing apparatus which applies the inventive weighing method described above. Said dosing apparatus for dosing one or more liquid products comprises at least one PLC and one or more dosing lines wherein each dosing line comprises
  a) at least one feeding line for the liquid product(s)
  b) optionally one or more delivery devices, preferably for feeding the liquid product(s) or other liquids into the vessel, discharging the vessel and/or transporting the product(s) through the dosing line
  c) optionally at least one feeding line for one or more liquid diluents and/or solvents
  d) a vessel the weight of which is weighed by a weighing device
  e) at least one discharging line for the dosed product(s)
  f) optionally one or more application devices connected with the discharging line and consuming the dosed product(s).

Preferably, the dosing apparatus comprises 1 to 5, more preferred 2 or 3 dosing lines each for dosing one or more liquid products. The one or more PLCs may control one or more dosing lines and with respect to one dosing line either the whole dosing cycle or at least parts thereof. Preferably, one PLC controls all of the dosing lines. Each dosing line can enable one or more liquid products to be dosed.

The feeding line generally is made of a hose the material of which is chosen depending on the compatibility with the liquid product to be fed. Typically, the dosing hose is made of PVC or PEX-A. Of course other materials known in the art may as well be used if they are appropriate especially with respect to their resistance. In a preferred embodiment between 1 to 10, more preferred 5 to 8 liquid products are distributed on the dosing lines depending on their compatibilities to each other.

As described with respect to the method it is preferred that before the liquid product to be dosed is fed into the vessel one or more diluents and/or solvents are placed therein in specific amounts. This shall prevent that the liquid product remains in the vessel when the dosed product is discharged due to high concentrations. Otherwise the actual dosing amount arriving at the application device could be reduced in comparison with the desired dosing amount. Accordingly, the feeding of one or more diluents and/or solvents has to be provided by separate feeding lines which preferably are controlled by the same PLC as the feeding lines for the liquid products.

The kind of the solvent is not especially restricted provided that it dissolves the liquid product, is compatible with the liquid product and is appropriate to be used in the supposed application. In case that the liquid product represents one ingredient for a washing or cleaning cycle in a washing machine or a dishwasher the liquid diluent preferably is water. Liquid products used in washing or cleaning processed should be provided in a concentration of from 2 to 20 wt.-%, preferably 5 to 15 wt.-% and most preferred 10 wt.-% based on the product solution.

In a preferred embodiment the one or more diluents and/or solvents as well function as a medium for rinsing the vessel and/or transporting the liquid product through the dosing line to the application device. Accordingly, in this case each dosing line should preferably provide at least one connection from the feeding line of the diluents and/or solvents to the vessel and more preferred at least one further connection to another point in the dosing line from which the discharged dosed liquid product is transported to the application device.

Preferably, the number of feeding lines corresponds to number of liquid products to be dosed i.e. each of the liquid products is fed through a separate feeding line. This prevents a possible contact of the liquid products and guarantees their purity. Moreover, the feeding line does not have to be rinsed after one product is transferred into the vessel through said feeding line which facilitates the procedure and allows to reduce the rinsing material to the amount required for rinsing the vessel or adjusting a specific concentration of the solution of the liquid product.

Although the feeding of the liquid product(s) as well as of other substances used during the dosing cycle or their transport through the dosing line may be performed by gravitation or common mechanical devices preferably it proceeds by any kind of pumps like membrane pumps or tube crushing pumps. Preferably one pump is provided for each of the feeding lines and at least one pump attends to the transport through the dosing line and to the one or more application devices optionally connected to the dosing line(s).

Moreover, common structural parts used in such kinds of apparatus may be used, such as valves for example which help to control the process, especially the feeding of the liquid products to be dosed and/or any other kind of substances like diluents and/or solvents to the vessel and their discharging from the vessel as well as their storing for a time within the dosing line. Preferably, each of the valves is controlled by the PLC.

The vessel may be realized by any vessel known in the art. Generally, a mixing funnel is used. The maximum filling volume of the vessel i.a. depends on the kind of application for which the dosage is provided, the desired concentration of the liquid product in a solvent and the total amount of each of the liquid products to be dosed. For example in a dosing system appropriate for the commercial washing of textiles, especially for a medium customer segment using washing extruders with a load of about 40 to 100 kg textiles, in which the liquid products that are used in the washing or cleaning process should be provided in a concentration of from 2 to 20 wt.-%, preferably 5 to 15 wt.-% and most preferred 10 wt.-% based on the product solution, a typical vessel has a maximum filling volume of 1.5 to 5, preferably 2 to 3.5 l.

In a preferred embodiment the vessel is equipped with any kind of mixing device known in the art to facilitate the mixing of the liquid product and the solvent. Typically, the vessel comprises a stirrer. A bolt equipped with boreholes which are applied on its circumference is appropriate to increase the mixing in the vessel as well. Preferably, the bolt is positioned at the exhaust and also functions to control the discharge. In a preferred embodiment, the vessel is connected to the feeding pump in form of a flexible connection to reduce the apparative requirements.

The weighing device may be exemplified by a weight cell. In a preferred embodiment the weighing device is electronically connected with the PLC and continuously transmits the values obtained from the weighing device online to said PLC. The PLC compares the value for the weight obtained from the weight cell with the one which indicates that the desired dosing amount is reached and which is preset in the PLC. In case that the values are identical the PLC induces the halt of the feeding of the liquid product for example by controlling the corresponding feeding pump, and especially a valve in connection with the feeding line, which then closes.

Afterwards, the PLC induces the discharge of the mixture of the liquid product and the solvent and their transfer to the application device if no further products are supposed to be dosed into the vessel while it still contains the dosed liquid product. If further liquid products are supposed to be dosed by the same dosing line but in separate dosing cycles, preferably said liquid product/diluent mixture is transported to a point behind a delivery pump. Advantageously said point is preferably positioned between the vessel and the access to the one or more application devices, is mechanically separated, for example by a valve, from the discharging hose of the vessel and is connected with the feeding line of the rinsing medium. While the next liquid product is dosed in a further dosing cycle the first dosed liquid product can then be transported separately to the access of the application devices.

Preferably, each dosing line should be provided with a separate access to each of the application devices connected with the dosing apparatus. In case that the dosed liquid products are used to wash textiles, especially in a commercial laundry, the dosing apparatus should preferably provide an access to 1 to 10, more preferred 5 to 8 washing devices like washing extruders. In a preferred embodiment these are connected with each of the dosing lines comprised by the dosing apparatus.

Moreover, the present invention provides a dosing system for dosing one or more liquid products which comprises at least one dosing apparatus as described above and one or more other dosing apparatus. Preferably, the one or more other dosing apparatus comprise a time/amount dosing unit and/or a dosing device which measures the liquid's conductivity. A dosing device in which the dosage proceeds by a different weighing method is also appropriate. Of course other kinds of dosing devices known in the art may as well be applied.

In one embodiment the different dosing apparatus are separated from each other and optionally separately controlled by more than one programmable logic control as well. However, it is also possible that said different dosing apparatus have one or more points of intersection.

It is preferred that the different kinds of dosing apparatus are combined in one common dosing apparatus and the different dosing methods used just represent different dosing lines therein. In this case, it is possible that the totality of dosing lines is controlled by one PLC or by more than one programmable logic controls but which are arranged within one apparatus.

Preferably, the dosing system comprises 1 to 5, more preferred 2 or 3 dosing lines using the inventive weighing method or apparatus, respectively, and preferably 1 to 5, more preferred 2 or 3 dosing lines using conventional dosing methods or devices, respectively, especially when the dosing system is used for dosing liquid products which are applied in washing machines.

In a further embodiment it is possible to combine the above described dosing system additionally with one or more dosing apparatus for the dosage of solids as they are known in the art. Preferably, the dosing system comprises 1 to 3, more preferred only one dosing line for the dosage of solid products.

DESCRIPTION OF THE FIGURES

FIG. 1 represents a schematic view of a preferred embodiment of a dosing system which is preferably used to wash textiles and comprises two dosing lines for dosing liquid products wherein in dosing line 1 the dosage proceeds using the inventive weighing method and dosing line 2 uses a common time/amount dosing method. The corresponding application devices are not contained in the figure but in case that the system is used for washing textile they represent washing machines, preferably washing extruders. In the following description of FIG. 1 the application device is exemplified by a washing extruder. This is not supposed to limit the scope of the invention since any other kind of application device which uses dosed liquid products may be used instead, for example a dishwasher.

Figure 1:
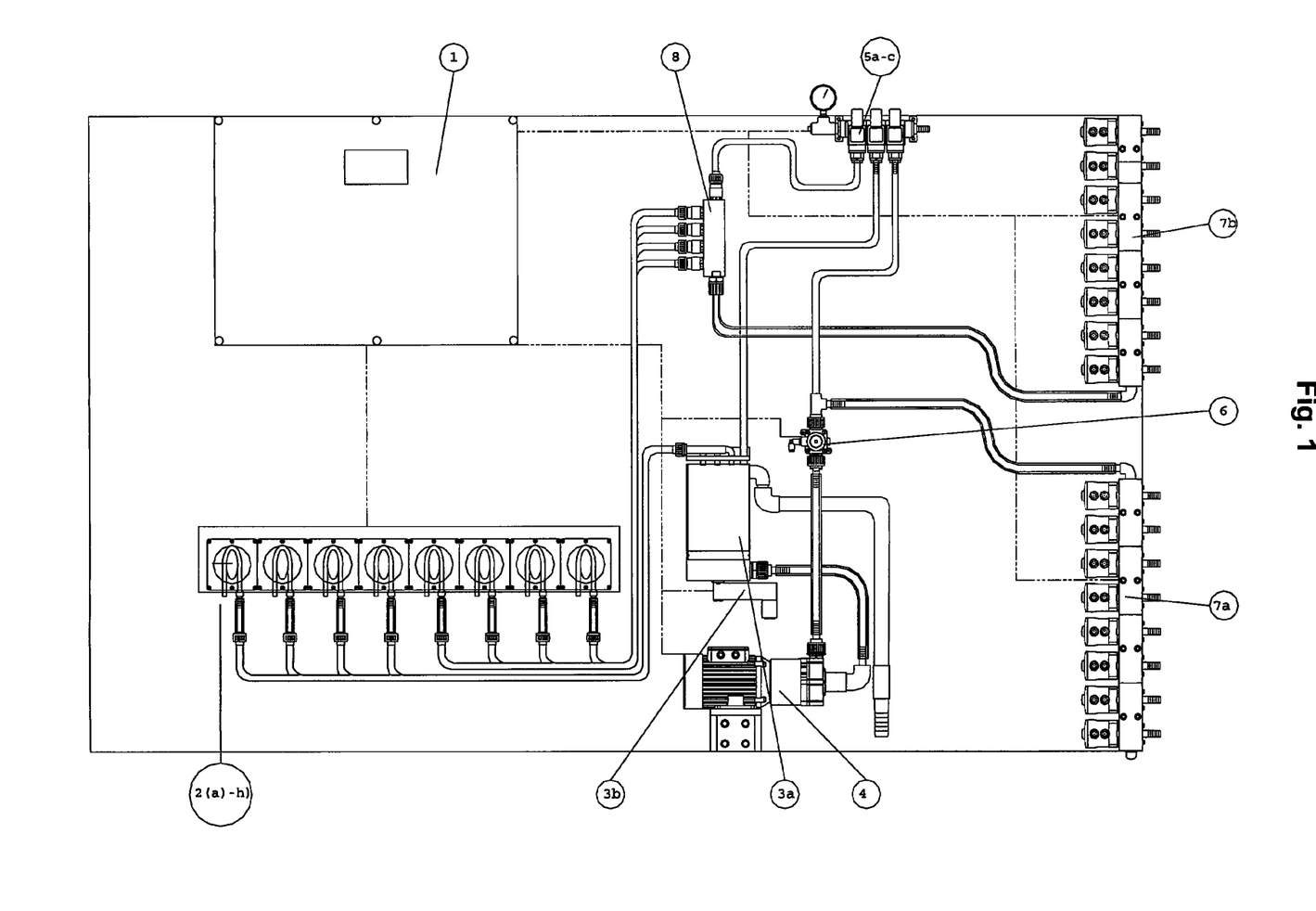
FIG. 1 shows a detailed schematic view of one preferred dosing system for applying the dosing method according to the invention

Accordingly, it is supposed that in the present case one washing extruder is connected to one of the eight valves from each valve block (7a,b). It is preferred that the eight washing extruders connected with dosing line 1 via the eight valves (7a) are identical with the washing extruders connected with dosing line 2 via the eight valves (7b), i.e. each of the dosing lines only has a separate access to each of the washing extruders but as a whole is connected to the same washing extruders.

The dosing system comprises a PLC (1) which has an electronic connection to the weighing device, a weight cell (3b). A dosing cycle is initiated by transmitting a starting signal from one of the eight washing extruders which are connected to the dosing system behind the valves 1 to 8 through a hose. The starting signal initiates a dosing program preset in the PLC. However, it is also possible to start a dosing cycle manually controlled by using the control unit (1).

The present dosing system provides the dosage of eight liquid products (a) to (h) wherein four ((a) to (d)) are dosed via dosing line 1 which uses a dosing apparatus according to the present invention, and the other four liquid products ((e) to (h)) are dosed via dosing line 2 which uses a time/amount dosing device. Each liquid product is fed through a separate feeding line wherein the feeding proceeds by using eight peristaltic pumps 2(a) to 2(h).

The liquid products (e) to (h) are directed through a manifold (8) connected by a hose to one of three flush valves (5) which allow the feeding of water as a solvent and rinsing medium. The liquid products (e) to (h) are directly transferred to valves 1-8 (7b) which provide an access to the eight washing extruders.

After the starting signal has initiated the dosing program the PLC (1) transmits a signal to open the corresponding valve (7b) leading to the washing extruder which has transmitted the starting signal. Moreover, the peristaltic pump (2) corresponding to the liquid product to be dosed first receives a signal from the PLC (1) to start working. Supposed this is one of products (e) to (h) the product is fed and transported through the manifold (8) to valves 1-8 (7b). The time required to feed the desired amount of the liquid product is preset in the PLC (1) and results from a former calibration. After the corresponding time elapsed the peristaltic pump (2) receives a signal from the PLC (1) to halt the feeding. Afterwards, the flush valve (5a) opens due to a further signal from the PLC (1) and a predetermined amount of water is flushed through the dosing line to rinse the liquid product still contained therein to the washing extruder. The flush time is also preset in the PLC (1). After said flush time elapsed the flush valve (5a) and the valve (7b) are closed by a signal from the PLC (1). The next dosing cycle is initiated according to the preset dosing program. This may either be a further liquid product dosed by dosing line 2 or a product dosed by the dosing line 1 using the inventive dosing method.

In case that the next liquid product is one of products (a) to (d) the peristaltic pump (2) corresponding to said liquid product to be dosed receives a signal from the PLC (1) next to start working. This results in the pump starting to feed the liquid product into the vessel (3a) of dosing line 1 which optionally already contains a predetermined amount of water and optionally other substances. Before starting the peristaltic pump (2) and while the feeding proceeds the weighing cell (3b) determines the weight of the vessel (3a) including the substances optionally contained therein. The value of the determined weight is continuously transmitted electronically to the PLC (1). In the PLC (1) all relevant weights of the vessel (3a) are preset, like the weight of the empty vessel, the weight of the vessel which contains the desired dosing amount of the liquid product and optionally a predetermined amount of water and of other substances or the weight of the vessel filled up to his maximum filling volume with the liquid product and optionally a predetermined amount of water and other substances. It is preferred to additionally preset the intermediate weights of the vessel in the PLC (1) like the weight of vessel and water.

As soon as said preset weight is reached in the vessel (3a) according to the measurement of the weight cell (3b), the PLC (1) induces the halt of the feeding in the peristaltic pump (2). The time needed to dose the corresponding amount of the liquid product is determined and used to calculate the time for optionally remaining dosing steps of said liquid product if the volume of the vessel is not sufficient to permit a dosage in one weighing step. Moreover, at the same time said feeding time is compared to former feeding times obtained for the same liquid product as saved on the PLC (1), preferably in form of the time/amount ratio. In case the actual time differs from the expected one due to the former measurements to an extent exceeding a specific standard deviation a signal is induced by the PLC (1).

At the same time when the feeding is halted, the check valve (6), preferably a three way valve, positioned between the delivery pump (4) and the valves 1-8 (7a) which provide an access to the washing extruders 1-8, as well as the valve (7a) corresponding to the washing extruder which initiated the dosing program are opened due to a signal from the PLC (1). The delivery pump (4) starts discharging the liquid product/water mixture due to a signal from the PLC (1) from the vessel (3a) to a point behind the check valve (6) for a preset time which has been calculated before and is preset in the PLC (1). At the same time one of the flush valves (5b) which is connected with the vessel (3a) through a hose, is initiated by the PLC (1) to rinse the vessel (3a) with water and to help to discharge the liquid product/water mixture from the vessel (3a).

If the preset flushing time elapsed the PLC (1) initiates the halt of the delivery pump (4) and the closing of the flush valve (5b) and the check valve (6) in direction of the vessel. At the same time one of the flush valves (5c) and the check valve (6) in direction of flushing valve (5c) and valves 1-8 (7a) open and water rinses the mixture through the final part of dosing line 1 and through the opened valve of valves 1-8 (7a) to the corresponding washing extruder. The flushing time as well is preset in the PLC (1). After said flushing time has been reached the flushing valve (5c), the check valve (6) and the corresponding valve of valves 1-8 (7a) are closed.

Afterwards, either a further dosing step for dosing the same liquid product via dosing line 1 by using the time/amount measurement may follow in case that the dosing amount exceeds the maximum filling volume of the vessel (3a) and two or more dosing steps are required. The required time is determined according to the feeding time obtained from the first dosing step. Or a further dosing cycle using dosing line 1 or 2 depending on the initiated dosing program may be started. The dosage according to one of the above described procedures is repeated until the desired dosing program is completed.

A further dosing program may be initiated directly after having completed one dosing program or later. It is also possible that the dosing program is not only initiated by transmission of the starting signal of a specific washing extruder but instead by the PLC in which a kind of time schedule for the course of several dosing programs in a predetermined sequence is preset.

In the following description of FIG. 2 to 6 the application device is exemplified by a washing extruder. This is not supposed to limit the scope of the invention since any other kind of application device which uses dosed liquid products may be used instead, for example a dishwasher. The PLC is not shown in FIG. 2 to 6 but it is supposed the each of the systems is controlled by one PLC although this is not intended to restrict the scope of the invention.

Figure 2:
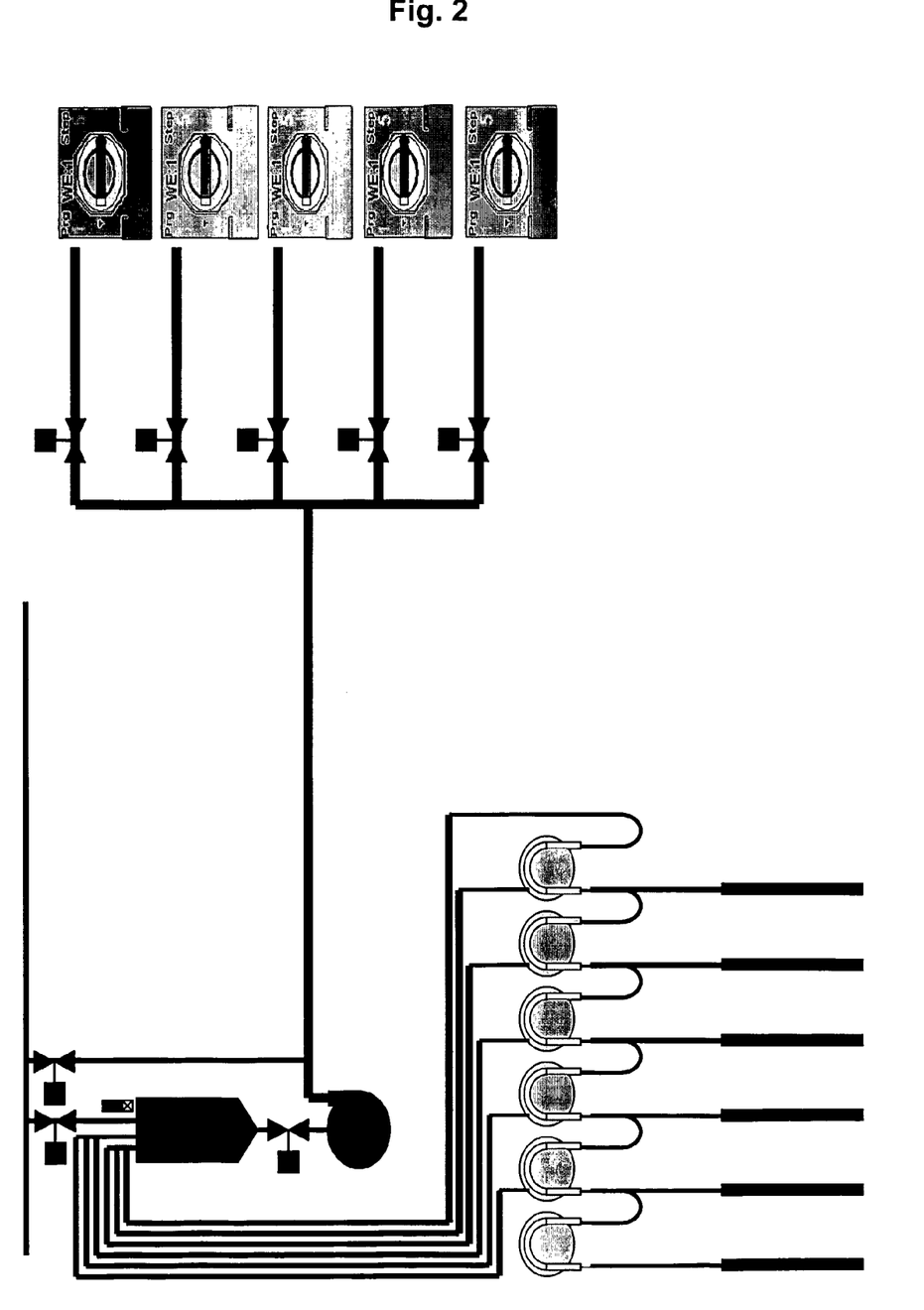
FIGS. 2 to 6 show a more general schematic view exemplifying further preferred embodiments of dosing systems The inventive dosing system is further illustrated by FIG. 1.

The embodiment shown in FIG. 2 shows a dosing apparatus comprising one dosing line which uses the inventive weighing method to dose six liquid products through separate feeding lines. With three liquid products the feeding lines each converge to a common access into the vessel. The dosing line is connected to five washing extruders.

Figure 3:
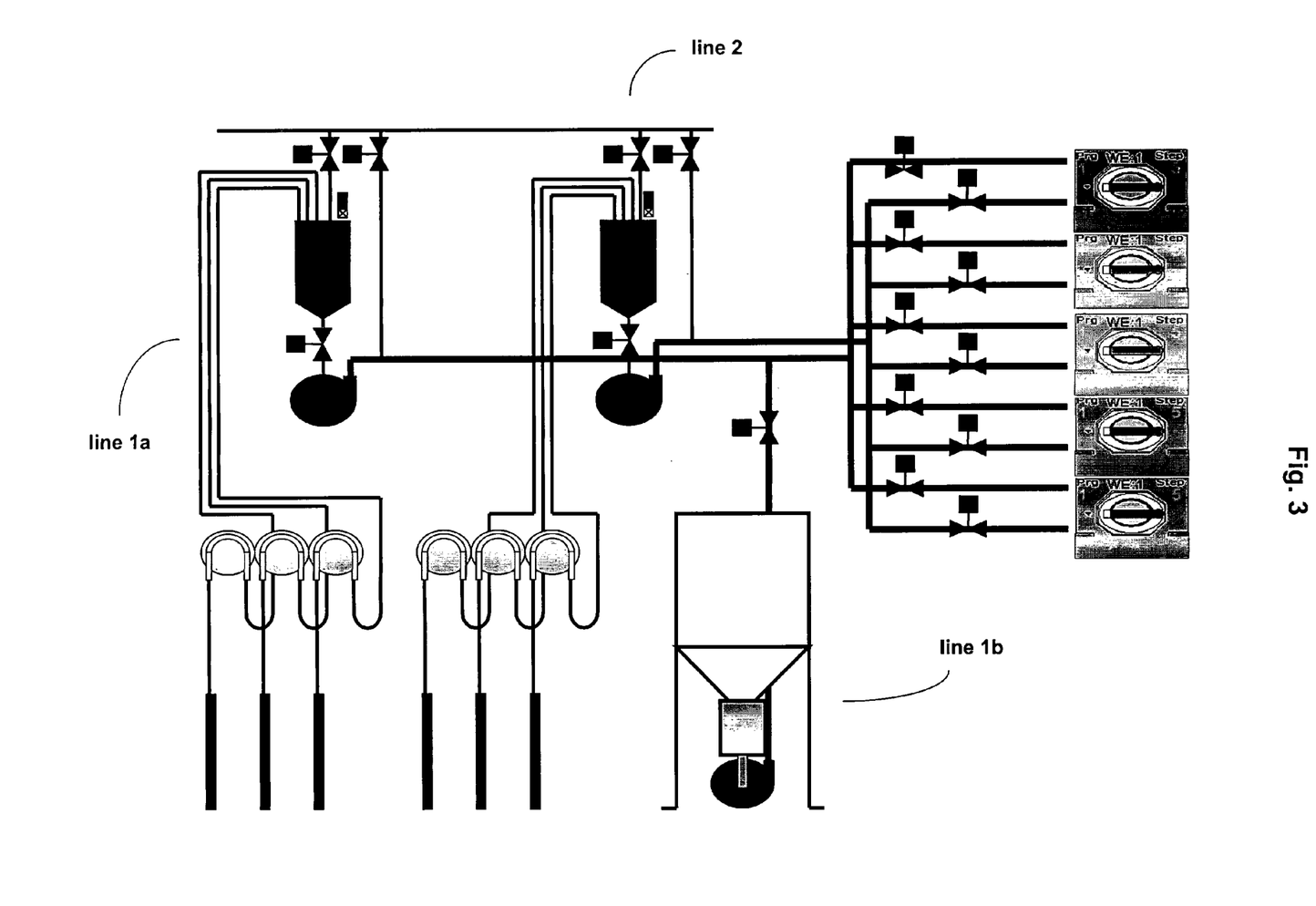

FIG. 3 shows a preferred embodiment comprising two dosing lines, both for the dosage of three liquid products each, wherein one dosing line (1) is separated in two parts. Lines 1a and 2 both use the inventive dosing method. Line 1b provides the dosage of a solid product. The dosing system comprises 5 washing extruders. Lines 1a and 1b have a common access to said washing extruders, whereas the one of line 2 is separated.

Figure 4:
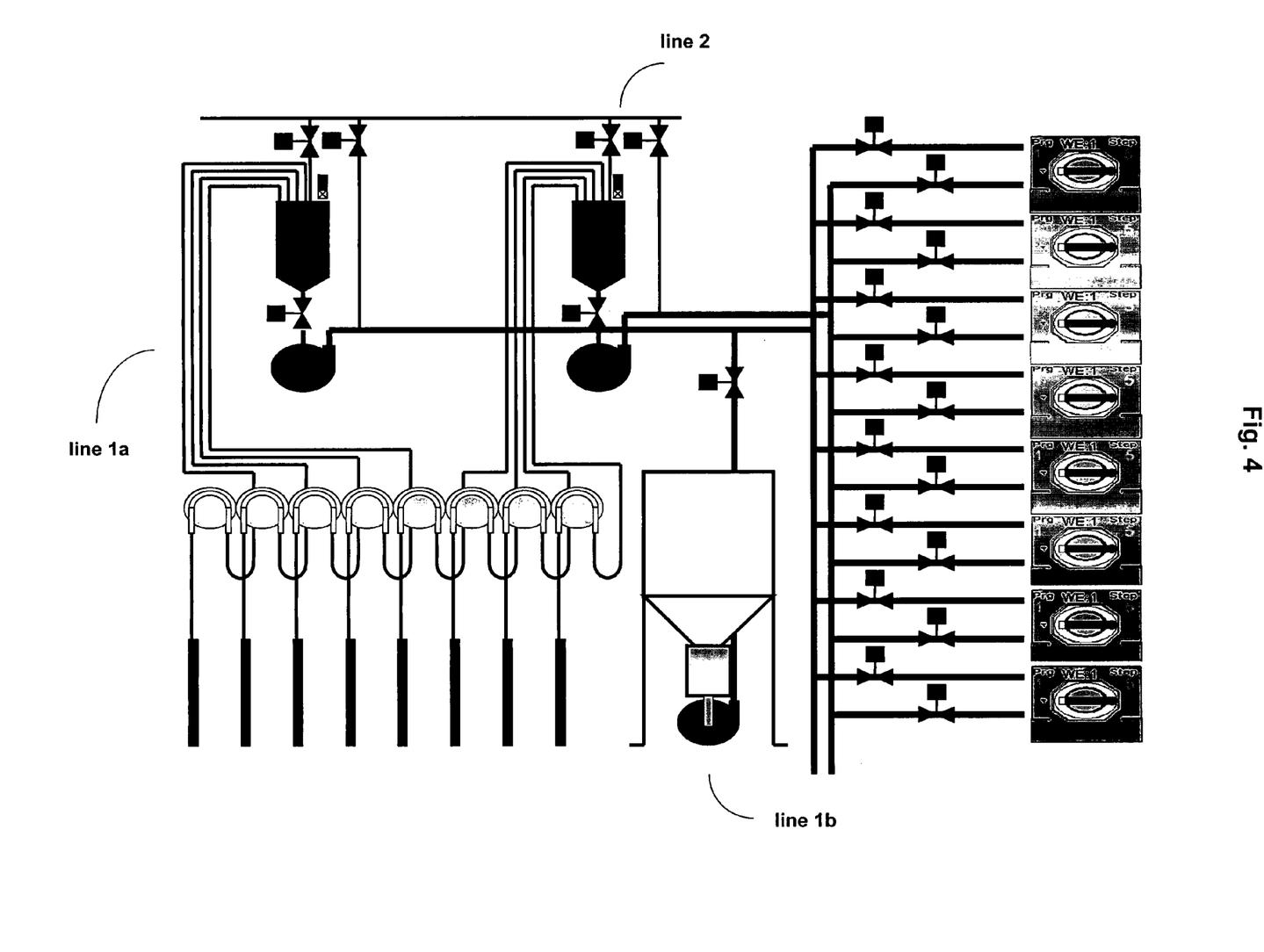

The dosing system shown in FIG. 4 is similar to the dosing system shown in FIG. 2 but comprises 8 feeding lines instead of six for dosing 8 liquid products wherein four lines each are part of one of two dosing lines. Moreover, 8 washing extruders are connected to each of the dosing lines.

Figure 5:
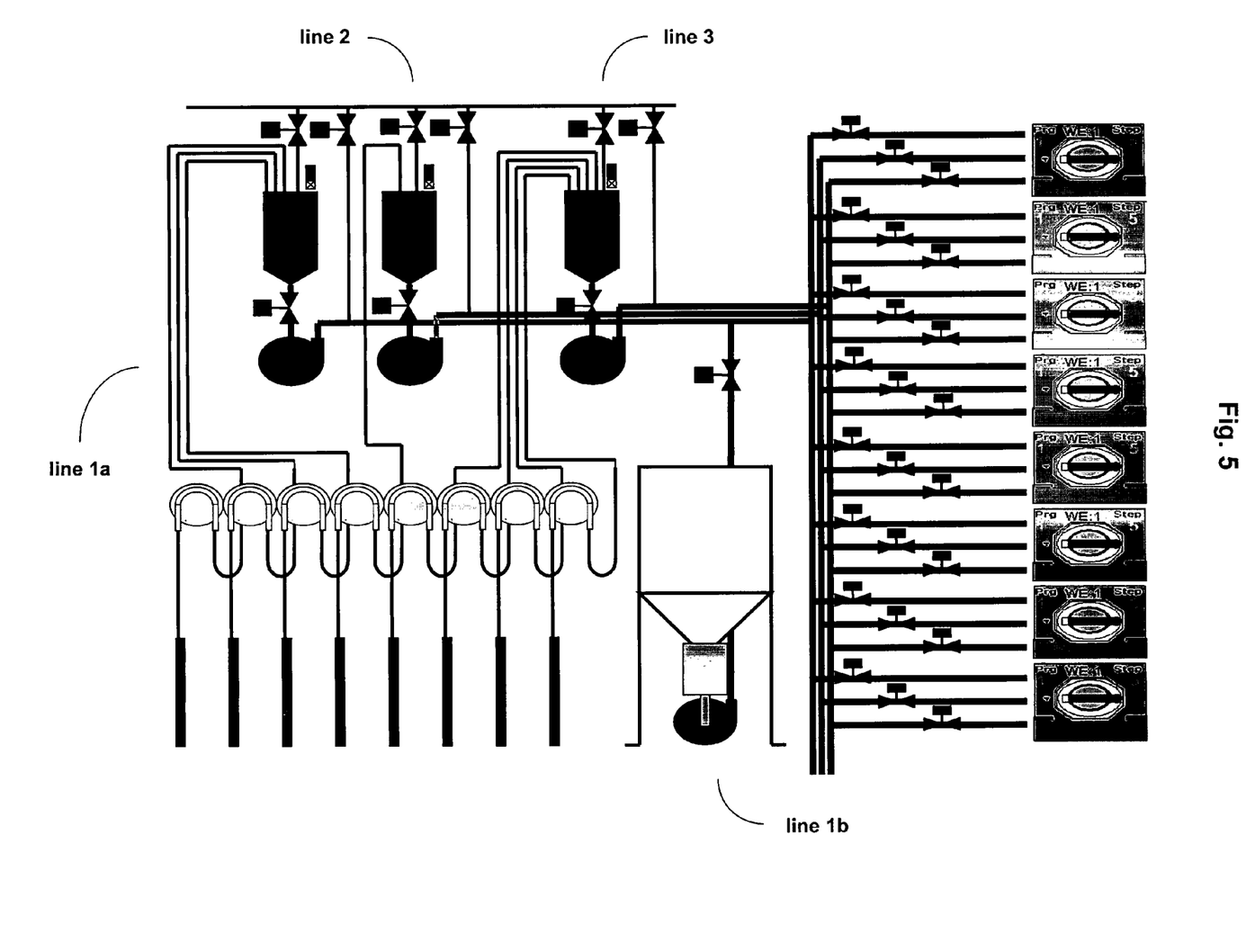

FIG. 5 shows a dosing system comprising three dosing lines wherein all three provide the dosage of liquid products whereas one line additionally provides the dosage of a solid. Three liquid products are dosed via line 1a, four via line 3 and one is dosed via line 2. Dosing lines 1a and 1b have a common access to the washing extruders whereas lines 2 and 3 each have a separate access. The dosing system comprises eight washing extruders.

Figure 6:
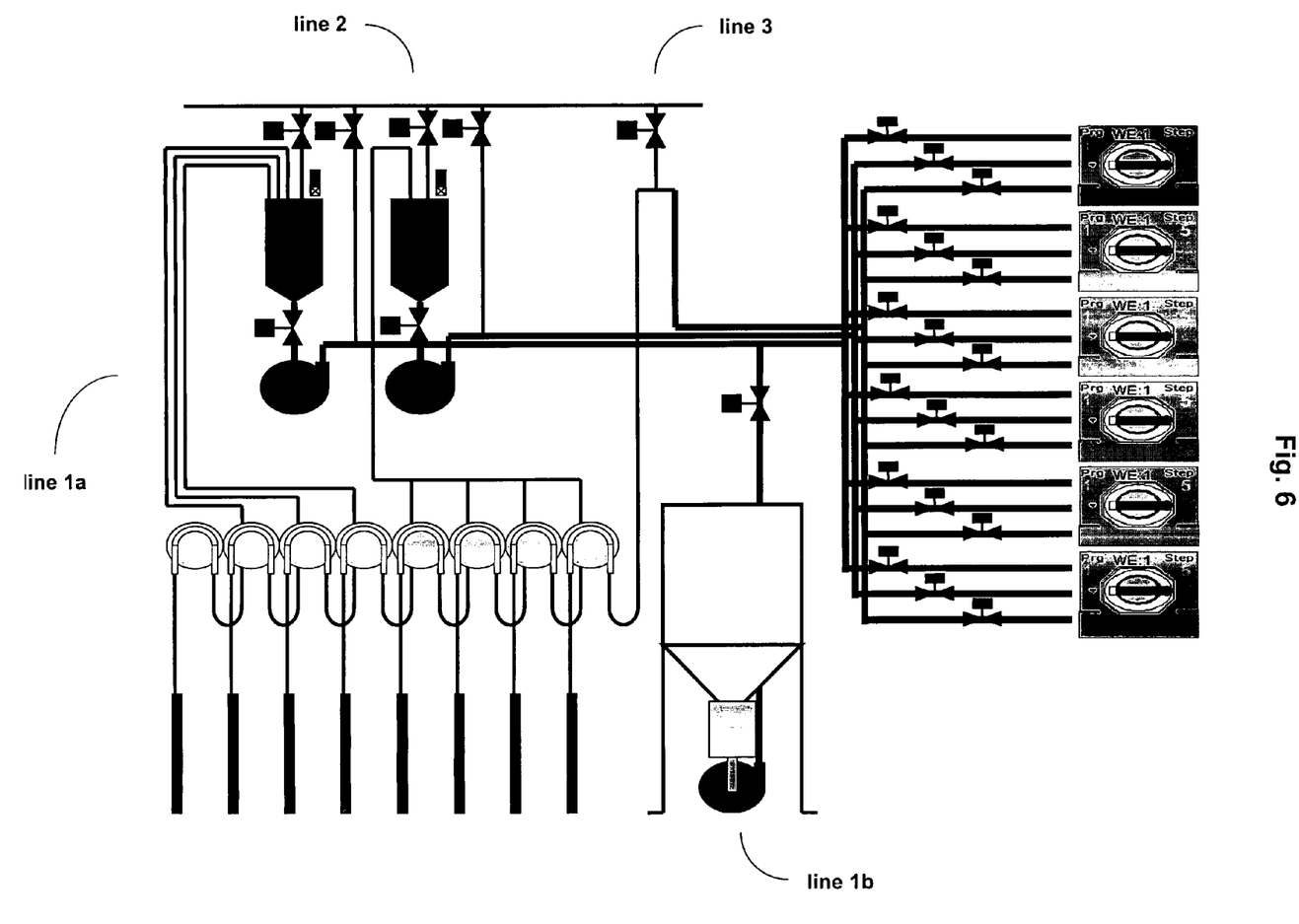

FIG. 6 shows a dosing system comprising three dosing lines for the dosage of eight liquid products and one solid. With lines 1a and 2 the dosing proceeds using the dosing method according to the invention and line 3 uses the common time/amount dosing method. Line 1 provides the dosage for three liquid (a) and one solid (b) product and line 2 for four liquid products whereas with line 3 only one liquid product is dosed. Lines 1a and 1b have a common access to the washing extruders, lines 2 and 3 each a separate one. The dosing system comprises 6 washing extruders.

The above described inventive dosing apparatus and dosing systems may be used in any kind of process in which at least one liquid product has to be dosed, especially in a process in which the dosage has to proceed very accurately and the dosing amount has to be exactly determined. Preferably, the inventive apparatus and systems are used in a process for washing textiles, like the ones accumulated in hospitals or in the food producing or processing industry, especially in commercial laundries, and/or for warewashing.

Correspondingly, the present invention refers to a method for washing textiles, especially in commercial laundries, comprising a dosing step in which at least one of the above described inventive dosing methods, and/or at least one of the above described inventive dosing apparatus or dosing systems, respectively, are used.

The invention claimed is:

1. A method of using a dosing apparatus to dose a liquid product for use in a washing machine or dishwasher, comprising:
   calculating a maximum filled weight of a vessel when it is filled to a maximum filling volume with the liquid product optionally together with one or more other substances;
   optionally feeding a preset amount of the one or more other substances into the vessel;
   feeding the liquid product into the vessel during a dosing cycle;
   continuously determining a weight of the vessel during the dosing cycle;
   monitoring the determined weight of the vessel to determine when the maximum filled weight of the vessel corresponding to the maximum filling volume of the vessel has been reached and thereupon halting the feeding of the liquid product;
   determining a feeding time required to feed the liquid product into the vessel until the maximum filled weight of the vessel is reached;
   discharging the liquid product and the optional one or more other substances from the vessel to the washing machine or dishwasher; and
   if the desired amount of liquid product exceeds the maximum filled weight of the vessel such that desired amount of liquid product corresponds to a larger volume than is made available by the maximum filling volume of the vessel, feeding a remaining amount of liquid product into the vessel based on the feeding time until the desired amount of the liquid product is reached.

2. The method of claim 1 further including initiating a subsequent dosing cycle.

3. The method of claim 2 further comprising comparing the feeding time for the dosing cycle to a previously determined feeding time corresponding to a previous dosing cycle and inducing a signal if the comparison yields a difference that exceeds a predetermined standard deviation.

4. The method of claim 1 further comprising dosing a second liquid product during a subsequent dosing cycle.

5. The method of claim 4 wherein dosing a second liquid product comprises dosing a different liquid product during the subsequent dosing cycle.

6. The method of claim 4 wherein feeding the liquid product comprises feeding a first liquid product and wherein dosing a second liquid product comprises feeding the second liquid product into the vessel containing the first liquid.

7. The method of claim 1 further comprising discharging the liquid product to the washing machine or dishwasher via a first dosing line and feeding the remaining amount of liquid product to the washing machine or dishwasher via the first dosing.

8. The method of claim 7 further comprising dosing a second liquid product to the washing machine or dishwasher based on the feeding.

9. The method of claim 4 further comprising discharging the liquid product to the washing machine or dishwasher via a first dosing line and dosing a second liquid product to the washing machine or dishwasher via a second dosing.

10. The method of claim 1 further including dosing one or more solid products to the washing machine or dishwasher.

11. A method for dosing a liquid product for use in a washing machine or dishwasher, the method comprising:
   transmitting a starting signal from the washing machine or dishwasher to a programmable logic control so as to start a dosing;
   feeding the liquid product into a vessel during a first step of the dosing cycle;
   continuously determining a weight of the vessel during the first step of the dosing cycle using a weighing device;
   continuously transmitting the determined weight to the programmable logic control;
   halting the feeding of the liquid product into the vessel when the weight of the vessel reaches a maximum filled weight of the vessel corresponding to the maximum filling volume of the vessel;
   measuring a feeding time required to feed the liquid product into the vessel until the weight of the vessel reaches the maximum filled weight of the vessel;
   discharging the liquid product from the vessel directly or indirectly into the washing machine or dishwasher; and if a desired amount of liquid product exceeds the maximum filled weight of the vessel such that desired amount of liquid product corresponds to a larger volume than is made available by the maximum filling volume of the vessel, feeding a remaining amount of liquid product into the vessel during one or more subsequent steps of the dosing cycle based on the feeding time until the desired amount of the liquid product is reached.

12. The method of claim 11 further comprising comparing the feeding time for the dosing cycle to a previously determined feeding time corresponding to a previous dosing cycle of the liquid product and inducing a signal if the comparison yields a difference that exceeds a predetermined standard deviation.

13. The method of claim 11 wherein the liquid product is an ingredient for a washing or cleaning cycle of the washing machine or dishwasher.

14. The method of claim 11 further comprising discharging the liquid product to the washing machine or dishwasher via a first dosing line and dosing a second liquid product to the washing machine or dishwasher via a second dosing line.

15. The method of claim 14 wherein each of the first and second dosing lines has a separate access to one or more washing machines or dishwashers.

16. A method of using a dosing apparatus for dosing a liquid product for use in a washing machine or dishwasher, the method comprising:
    starting a dosing cycle;
    feeding the liquid product into a vessel during a dosing cycle;
    determining a weight of the vessel during the dosing cycle using a weighing device;
    monitoring the weight of the vessel to determine when a maximum filled weight of the vessel corresponding to the maximum filling volume of the vessel has been reached, and halting the feeding of the liquid product into the vessel when the weight of the vessel corresponds to the maximum filled weight;
    measuring a feeding time required to feed the liquid product until the maximum filled weight is reached;
    discharging the liquid product from the vessel to the washing machine or dishwasher; and
    if the desired amount of the liquid product exceeds the maximum filled weight of the vessel such that desired amount of liquid product corresponds to a larger volume than is made available by the maximum filling volume of the vessel, feeding a remaining amount of the liquid product into the vessel based on the feeding time until the desired amount of the liquid product is reached.

17. The method of claim 16 further comprising discharging the liquid product to the washing machine or dishwasher via a first dosing line and dosing a second liquid product to the washing machine or dishwasher via a second dosing line.

18. The method of claim 16 wherein dosing a second liquid product to the washing machine or dishwasher via a second dosing line further comprises dosing the second liquid product to the washing machine or dishwasher via the second dosing line based on a feeding time corresponding to the second liquid product.

19. The method of claim 16 wherein the liquid product is an ingredient for a washing or cleaning cycle of the washing machine or dishwasher.

20. The method of claim 1 wherein discharging the contents of the vessel to the washing machine or dishwasher comprises discharging the contents of the vessel directly to the washing machine or dishwasher.

21. The method of claim 1 wherein discharging the liquid product and the optional one or more other substances from the vessel to the washing machine or dishwasher comprises discharging the contents of the vessel to an intermediate storing vessel and transferring contents of the intermediate storing vessel to the washing machine or dishwasher.

22. The method of claim 1 wherein discharging the liquid product and the optional one or more other substances from the vessel to the washing machine or dishwasher comprises discharging the contents of the vessel to a mixing vessel in which the contents of the vessel are combined with other substances and then transferring contents of the mixing vessel to the washing machine or dishwasher.

23. The method of claim 1 wherein optionally feeding a preset amount of the one or more other substances into the vessel comprises optionally feeding a preset amount of one or more of a liquid solvent, a diluent or an additive.

24. The method of claim 1 further comprising calculating a time/amount ratio based on the determined feeding time.

25. The method of claim 1 further comprising:
    determining the remaining amount of liquid product based on the maximum filled weight of the liquid product; and
    determining a number of subsequent dosing cycle steps required to achieve the desired amount of liquid product.

26. The method of claim 24 further comprising determining an amount of time required to feed the remaining amount of liquid product into the vessel based on the time/amount ratio.

* * * * *